FALSE TWISTING DEVICES FOR TEXTILE YARNS AND THE LIKE

Original Filed Sept. 10, 1956

United States Patent Office

Re. 26,229
Reissued June 27, 1967

26,229
FALSE TWISTING DEVICES FOR TEXTILE YARNS AND THE LIKE

Ernest P. R. Scragg and Austin Dobson, Macclesfield, England, assignors to Ernest Scragg & Sons (Holdings) Limited, a British company Original No. 2,872,769, dated Feb. 10, 1959, Ser. No. 608,883, Sept. 10, 1956. Application for reissue Sept. 9, 1963, Ser. No. 308,053, which is a continuation of Ser. No. 86,834, Feb. 2, 1961
3 Claims. (Cl. 57—77.45)

Matter enclosed in heavy brackets [ ] appears in the original patent but forms no part of this reissue specification; matter printed in italics indicates the additions made by reissue.

*This application is a continuation of application for reissue Ser. No. 86,834, filed Feb. 2, 1961, and now abandoned.*

This invention relates to false twisting devices for textile yarns and the like which are used to impart a so-called "false twist" or crimp, for example to nylon and like synthetic yarns.

Known false twisting devices include a spinner, through which the yarn is passed, the spinner being rotated at a high speed so as to impart the crimp to the yarn, a usual speed of rotation being in the region of, for example, twenty thousand revolutions per minute. Such prior constructions have employed rotary bearings, such as ball races, and it has been impossible to provide an arrangement capable of being used at speeds very much faster than twenty thousand revolutions per minute, mainly because such bearings are incapable of supporting a spindle at high speeds and are subject to overheating, mechanical failure and the like when used over a long period, such as several hours running without stopping.

It is an object of the present invention to provide an arrangement which permits a spinner to be rotated at greatly increased speeds over long periods of time without stopping and which, in addition, when not driven may be subjected to a braking action so that rotation of the spinner is arrested rapidly.

According to the present invention in a spinner assembly for use in the false twisting of textile fibres, the spinner when rotating does not rotate in cylindrical bearings of any type either plain or roller but is supported only by rollers on one side and a belt from which it gets its rotation on the other. The assembly wherein the spinner is mounted comprises a housing or frame, a pair of spaced parallel rollers rotatably mounted substantially vertically in said housing, and a spinner tube having an enlarged head arranged parallel to said rollers in a hole in said housing. There is a substantial clearance between said spinner tube and said hole, the spinner tube when stationary being located by engagement of said enlarged head with said housing and, when driven by moving said housing so that said spinner tube contacts a travelling belt, is raised by engagement of said belt with a conical portion on said spinner tube so as to move the latter into contact with said rollers whereby, when it is driven, the spinner tube is entirely supported by said belt and said rollers.

These rollers *or rotary members* can be made of metal or any plastic material and the driving surface may be much improved by fitting endless bands of cloth tapes made from material such as nylon, cotton, Terylene, which are well known in the textile industry. These tapes can be stretched and cemented into position on the driving faces of the rollers. They provide a soft drive to the spinner tube and considerably reduce the noise which is present if metal or plastic rollers are used without such coverings.

With such arrangement, rotational speeds of the spinner tube up to 100,000 revolutions per minute can be obtained without any fear of mechanical failure, as the much larger diameter supporting rollers are revolving at very much lower speeds than the small diameter spinner tube.

The conical portion on the spinner tube is preferably contiguous with the enlarged head thereon.

The invention will be described further, by way of example, with reference to the accompanying drawings, in which.

Figure 2:
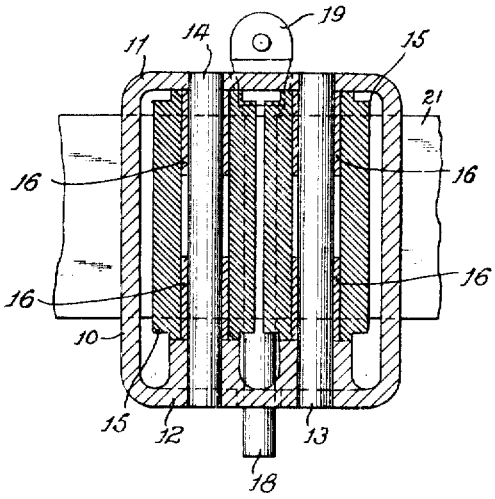
FIG. 2 is a cross-sectional side elevation taken on the line II—II of FIG. 1.
Figure 1:
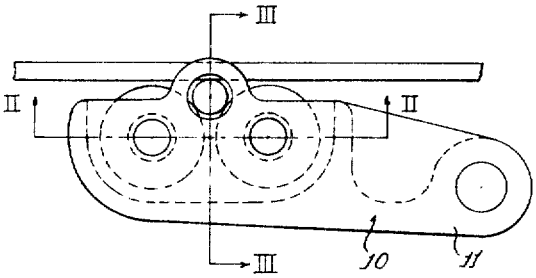
FIG. 1 is a plan view of a spinner assembly constructed in accordance with the invention.

In the drawings, a spinner assembly constructed in accordance with the invention comprises a U-shaped or open sided metal housing 10 disposed with the flanges 11, 12 of the U approximately horizontal, one above the other. Two vertical axles or spindles 13, 14, extend vertically between the flanges 11, 12, of the U, parallel to one another and rollers *or rotary members* 15 are mounted on these spindles by means of suitable bearings 16 (see FIG. 2) so as to be rotatable thereon. There is a slight clearance between the roll, as can be seen in FIG. 1.

Figure 3:
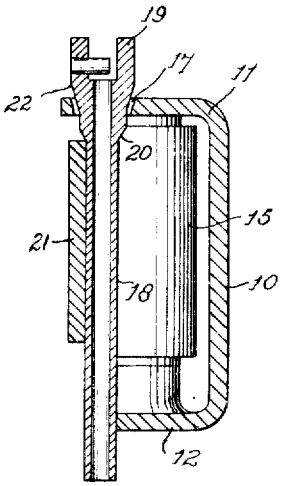
FIG. 3 is a cross-sectional end elevation taken on the line III—III of FIG. 1.

A hole 17 is provided in the upper flange 11 of the U, at a point midway between the two rollers 15 and displaced to one side of a line joining the axes of the rollers 15 and this accommodates a *tubular member or* spinner tube 18 having an enlarged head 19. The spinner tube 18, omitted in FIG. 1 for the sake of clarity, has a very loose fit in the hole 17 and can be moved about substantially therein, location thereof being by engagement of the enlarged head 19 with the upper flange 11 of the U-shaped housing, when the spinner tube 18 is not being driven (which is to be described later). The enlarged head 19 tapers into the spinner tube 18 and this provides a conical portion 20 on the spindle. *It will be noted particularly from FIG. 1 that the diameters of the rollers or rotary members 15 and the spinner or tubular member 18 have at the point of contact therebetween a ratio of at least 3 to 1. The tubular member 18 has an exterior running surface from which it is supported by contact with the rollers or rotary members 15, on the one hand, and the drive belt 21, on the other hand. As may be seen from FIGS. 2 and 3, the tubular member 18 carries at its upper end portion 19 a thread guide for receiving thread from the passageway formed by interior of the tubular member 18.*

The housing 10 is suitably supported by a lever or like system (not shown) by means of which it may be moved sideways, in a horizontal plane, so as to bring the spinner into surface contact with a travelling belt, which is shown at 21 in the drawings, the plane of the belt 21 being approximately vertical, whereby the spinner 18 is driven. This movement brings the conical portion 20 into contact with the upper edge of the belt 21, so causing the spinner 18 to rise slightly to disengage the head 19 from engagement with the upper limb 11 of the housing, and at the same time the spinner tube *or tubular member* is moved in the hole 17 so as to be pressed against the rollers 15, so that it is supported between these latter and the belt. *Thus, the pair of rollers or rotary members 15 are rotatable about spaced axes and form therebetween a throat which receives the tubular member 18, the belt 21 forming a drive means for imparting rotation to the tubular member 18 and for urging the same into the throat of the supporting rotary members 15, and the housing 10 forms a means mounting the supporting rotary*

*members 15 for pivotal movement toward and away from the drive means 21.*

The yarn or thread to be twisted or crimped passes through the spinner tube 18 in known manner, and with the arrangement described exceptionally high rotational speeds are attainable.

When the housing 10 and spindle 18 are moved away from the belt, the latter falls again, because the conical portion 20 is taken out of contact with the belt 21 so that the enlarged head 19 once again drops into engagement with the housing 10. This causes frictional engagement, with the result that a braking action is applied to the spinner tube 18 and it is arrested rapidly. In the embodiment illustrated, the spinner tube head 19 is provided with a second conical portion 22 and the hole 17 is complementary thereto, so as to ensure adequate frictional engagement therebetween.

The rollers *or rotary members* 15 may be surfaced with bands of material such as nylon, cotton or the like, which bands may be applied by stretching them over the rollers and cementing in position.

We claim:

1. A spinner assembly for use in the false twisting of textile fibers comprising, in combination with a vertically disposed belt, an open sided housing with top and bottom flanges and mounted with its open side facing the belt and movable toward and from the belt, a pair of spaced parallel rollers rotatably mounted in the flanges of said housing, the flanges of the housing having registering holes therein with the center line of the holes in a vertical plane midway between the axes of the rollers and between the plane of said axes and the open side of the housing, a spinner tube disposed in said holes and engageable with said rollers and having a diameter less than that of the holes to provide a substantial clearance for the spinner tube in the holes and permit the tube to move into and out of engagement with the rollers, the tube having an enlarged flange-engaging head on its upper end with a lower conical portion disposed to be engaged by the belt for axially raising the spinner tube as the housing is moved to cause the tube to engage the belt and be moved into engagement with the rollers.

2. A spinner assembly as defined in c'aim 1 in which the hole in the upper housing flange is conical and the enlarged head of the spinner tube is conical and adapted to engage frictionally in said hole when the spinner tube is free from the belt.

3. A spinner assembly as defined in claim 2 in which the rollers are fabric surfaced.

References Cited

The following references, cited by the Examiner, are of record in the patented file of this patent or the original patent.

UNITED STATES PATENTS

| | | | |
|---|---|---|---|
| 2,227,910 | 1/1941 | Pool | 57—77.40 X |
| 2,557,104 | 6/1951 | Hegedus | 57—77.33 |
| 2,777,276 | 1/1957 | Klein | 57—77.30 |
| 2,791,086 | 5/1957 | Hilbert et al. | 57—77.45 |
| 2,810,254 | 10/1957 | Buchanan | 57—77.33 |
| 2,821,062 | 1/1958 | Boillat et al. | 57—77.33 |
| 2,829,487 | 4/1958 | Stoddard et al. | 57—77.45 |

FOREIGN PATENTS

| | | |
|---|---|---|
| 674,122 | 6/1952 | Great Britain. |

ROBERT R. MACKEY, *Primary Examiner.*

RUSSELL C. MADER, DONALD PARKER, *Examiners.*